Figure 1:
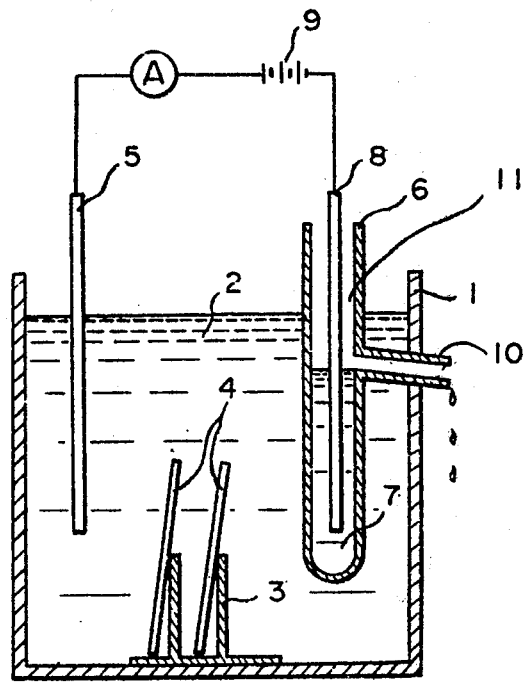

United States Patent

Matsumori et al.

[11] 3,879,274
[45] Apr. 22, 1975

[54] ELIMINATION OF HARMFUL SUBSTANCES FROM MOLTEN SALT USED IN THE ION EXCHANGE TREATMENT OF GLASS ARTICLES

[75] Inventors: Hiromi Matsumori, Nishinomiya; Nobuyoshi Ohsato, Itami; Jun Hasegawa, Takarazuka, all of Japan

[73] Assignee: Nippon Sheet Glass Co., Ltd., Osaka, Japan

[22] Filed: Dec. 6, 1972

[21] Appl. No.: 312,502

[30] Foreign Application Priority Data
Dec. 9, 1971   Japan.................................. 46-99974

[52] U.S. Cl. ...................... 204/130; 204/39; 65/30
[51] Int. Cl. ............................................. C01c 21/00
[58] Field of Search .................. 204/130, 39; 65/30

[56] References Cited
UNITED STATES PATENTS

| | | | |
|---|---|---|---|
| 1,371,698 | 3/1921 | Linder | 204/130 |
| 2,782,156 | 2/1957 | Raynes | 204/130 |
| 3,441,398 | 4/1969 | Hess | 65/30 |
| 3,445,316 | 5/1969 | Megles | 65/30 |
| 3,711,393 | 1/1973 | Garfinkel | 65/30 |
| 3,726,772 | 4/1973 | Takahashi et al. | 204/130 |
| 3,772,003 | 11/1973 | Gordy | 204/117 |

OTHER PUBLICATIONS
"Electrochemistry, Principles & Practice" by C. J. Brockman, 1931, pgs. 203-204.

*Primary Examiner*—R. L. Andrews
*Attorney, Agent, or Firm*—Wenderoth, Lind & Ponack

[57] ABSTRACT

In the method of eliminating from the molten salt used in the ion exchange treatment of glass articles those substances which are harmful to the ion exchange operation, the improvement which comprises using an arrangement wherein an anode and a cathode are disposed in a bath of molten salt maintained at an elevated temperature, with the proviso that said cathode is disposed in a small chamber partitioned in isolation from the rest of the molten salt bath by means of a partitioning wall, said wall being made of a material that is not corroded by the molten salt at said elevated temperature, said material having penetrant pores capable of holding the molten salt in its body when immersed therein, the size of said pores being sufficiently minute that a great resistance is demonstrated to the diffusive flow of the harmful substances, said material being also conductive as a result of the ion conductivity through the molten salt held in said pores; and applying a voltage across said anode and cathode to effect the flow of an electric current.

4 Claims, 4 Drawing Figures

ELIMINATION OF HARMFUL SUBSTANCES FROM MOLTEN SALT USED IN THE ION EXCHANGE TREATMENT OF GLASS ARTICLES

This invention relates to a method of eliminating from the molten salt used in the ion exchange treatment of glass articles those substances that have a harmful effect in carrying out the ion exchange operation.

Numerous methods have been proposed in connection with the ion exchange treatment of glass articles with the object of coloring or crystallizing the surface of glass articles, modifying their surface properties such as a thermal expansion coefficient by the introduction to the surface of the glass article of the desired ions by ion exchange, or of enhancing the strength of the glass articles by the introduction into the article of ions having a radius greater than that of the ions contained therein.

While numerous patents are known, such as indicated above, which concern methods per se of introducing into glass a specific ion for a specific purpose, various difficulties are encountered in actually carrying out these methods. In consequence, fully satisfactory results cannot be obtained in most cases. This will be illustrated hereinbelow, using as a typical example of the ion exchange method, the method of ion exchange treatment, the object of which is to improve the strength of glass articles (the method of chemically strengthening glass articles).

The usual method of chemically strengthening glass articles is that consisting of contacting the glass article at an elevated temperature of below its deformation temperature with a molten salt containing an alkali metal $R'$ having a larger ion radius than that of the alkali metal $R$ contained in the glass article to form in the surface layer a mutually substituted layer resulting from the exchange of the ions of the aforesaid alkali metals $R$ And $R'$, with the consequence that a great compressive stress layer is set up in the surface layer of the glass to improve the breakage strength of the glass article. As the molten salt to be contacted, the nitrate salts such as potassium nitrate and sodium nitrate are used mostly from a consideration of the thermal characteristics of the salt and the effects of the co-existing ions. While this chemical strengthening method is an excellent method in that it can strengthen those glass of uneven thickness as well as the thin glass whose strengthening was not possible by the heat strengthening method wherein the compressive stress layer of the surface layer was formed by heating the glass article up to the neighborhood of its softening point and thereafter quenching of the article, it is actually not being fully practiced on a commercial scale. The principal cause can be attributed to the following two reasons. First, the fact that it is not economical because the treatment requires too much time. And secondly, because of the gradual degradation of the molten salt by the treatment, with the consequence that the glass article to be treated are harmfully affected. As regards the former of these two reasons, the speed of the ion exhcnage at a temperature below the strain point of the glass article, i.e., the temperature at which the chemical strengthening method is usually carried out, is slow, with the consequence that there is the drawback that a prolonged period of time of 10 to 20 hours is required for imparting the desired strength to the glass article. On the other hand, as regards the latter reason, it can be said that a degradation of the ion exchangeability of the molten salt is brought about with an increase in the time at which the molten salt is held at an elevated temperature, say, of 500° – 600°C. If the chemical strengthening method is carried out using this degraded molten salt, harmful effects are demonstrated such as the surface of the glass article being corroded by the molten salt, the degree of strengthening being less than that desired, or that there is a decline of the weatherability of the treated glass article to result in its surface becoming unlustrous and discolored while being subsequently used. This degradation of the molten salt not only takes place when the glass article is submitted to the ion exchange treatment at an elevated temperature but also occurs when the molten salt is merely held at an elevated temperature. It is possible to prevent the adverse effects resulting from the foregoing degradation by constantly exchanging the molten salt with a fresh supply of molten salt after it has been used for a short period of time, but since the molten salt is quite expensive, a frequent change such as this is exceedingly uneconomical and hence cannot possibly be employed as a practical matter. In recent years, there has been proposed a method of treatment in which a still higher temperature is used than heretofore for the purpose of increasing the speed of ion exchange and the degree of strengthening obtained. Another suggested method is that of carrying out the chemical strengthening treatment using a chemically instable mixed salt instead of a single salt. While these improvements are effective in solving one of the shortcomings of the chemical strengthening method, i.e., reducing the length of the treatment time, they do not improve the foregoing degradation phenomenon, which takes place in the molten salt when held for a prolonged time, but rather accelerates this latter phenomenon. Thus, an effective method of preventing this degradation of the molten salt has not been known at all heretofore.

In consequence of years of research on our part concerning the chemical strengthening method, we found that the reason why this chemical strengthening method, though theoretically exceedingly superior and being a treatment method that should bring great advantages in the area of the use of glass articles is not put to practice on commercial scale is because of its high cost of operation as compared with the conventional thermal strengthening method and that the principal reason therefor is because there has not yet been proposed an effective method of preventing the hereinbefore-described degradation of the molten salt.

An object of the present invention is to provide a new method which effectively prevents the degradation phenomenon that occurs in a molten salt when this molten salt, which is used in the ion exchange treatment of glass article, is exposed to elevated temperatures. Another object is to provide a new method of treatment for a once degraded molten salt by submitting it to a regeneration treatment and thus restoring the molten salt to one having a capacity comparable to a fresh molten salt.

Thus, in the method of eliminating from the molten salt used in the ion exchange treatment of glass articles those substances which are harmful to the ion exchange operation, there is provided according to the present invention a method which comprises using an arrangement wherein an anode and a cathode are disposed in a bath of molten salt maintained at an elevated temperature, with the proviso that said cathode is disposed in a small chamber partitioned in isolation from the rest of the molten salt bath by means of a partitioning wall, said wall being made of a material that is not corroded by the molten salt at said elevated temperature, said material having penetrant pores capable of holding the molten salt in its body when immersed therein, the size of said pores being sufficiently minute that a great resistance is demonstrated to the diffusive flow of the harmful substances, said material being also conductive as a result of the ion conductivity through the molten salt held in said pores; and applying a voltage across said anode and cathode to effect the flow of an electric current.

Figure 2:
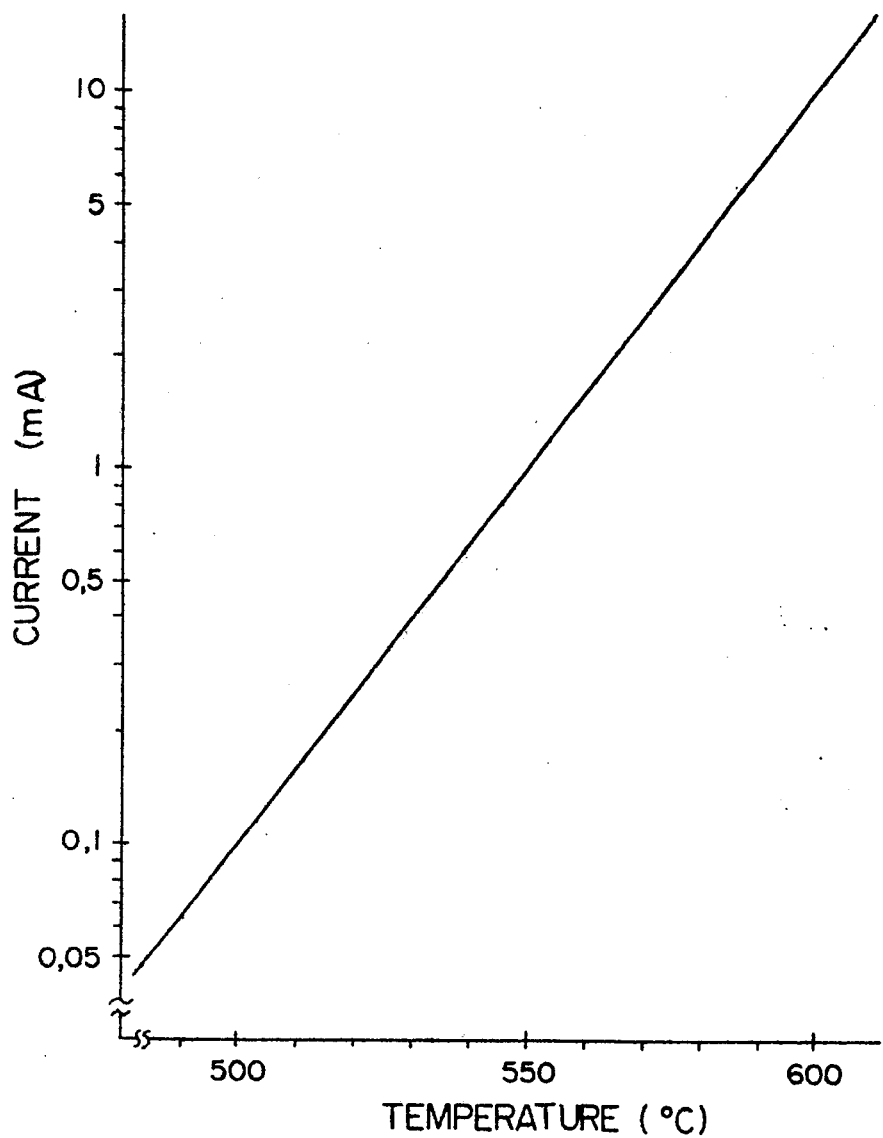
Figure 3:
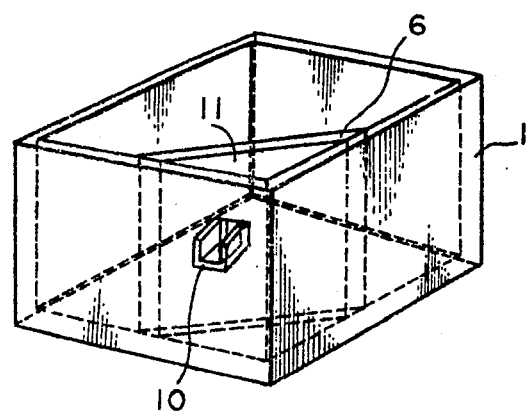
Figure 4:
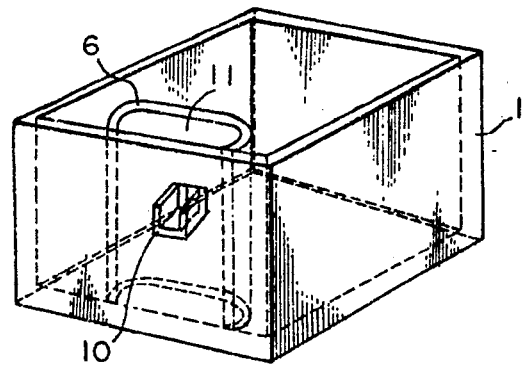

The invention will now be more fully described by reference to the accompanying drawings; wherein FIG. 1 is a schematic side view illustrating one mode of a chemical treatment apparatus for glass articles by which the invention method is practiced;

FIG. 2 is graph showing the relationship between the temperature and the minimum current to be employed for ensuring that the glass article is not corroded when carrying out its treatment in the apparatus shown in FIG. 1 by continuously flowing an electric current; and FIGS. 3 and 4 are views illustrating modifications of the foregoing apparatus for carrying out the method of the present invention.

First, the terms used in the specification and claims will be defined. The "glass" broadly means glasses and glass ceramics. The terminology "the molten salt used in the ion exchange treatment of glass articles," which hereinafter will be referred to as merely "molten salt," is meant to be a molten salt which having as its purpose the strengthening of a glass article or otherwise modifying the surface properties thereof is used to carry out the ion exchange between the glass article by effecting its contact with the glass article at an elevated temperature. The foregoing ion exchange technique and the molten salt to be used therein are known per se. The expression "the substances harmful to the ion exchange treatment" (hereinafter to be referred to as merely "harmful substances") is meant to be those substances which are believed to bring about harmful effects on the glass article by having a surface corroding action when the foregoing ion exchange treatment is being carried out or by causing the surface of the glass article to become unlustrous or discolored during its use subsequent to the ion exchange treatment. As previously noted, it is a known fact that the undesirable phenomena such as above described are caused principally by the degradation of the molten salt that results from holding the molten salt for a prolonged period of time at elevated temperatures. Again, while it is generally believed that the degradation of the molten salt is brought about by the accumulation of the harmful substances in the molten salt, the entity of the harmful substances has not yet been completely and definitely clarified. It is however presumed that these harmful substances are probably the thermally decomposed products of the molten salt and the alkali metal ions that have migrated into the molten salt from the glass article as a result of the ion exchange.

The novel feature of the present invention resides in the point that the foregoing harmful substances which, when once formed in the molten salt, become exceedingly difficult of elimination therefrom, are efficiently removed by a very simple method, with the consequence that the degraded molten salt can be restored to its previous active state.

The invention method can be practiced with the use, say, of the apparatus shown in FIG. 1. Referring to FIG. 1, a vessel 1 contains a molten salt 2, which is to be regenerated, the molten salt being held at an elevated temperature. An anode 5 is disposed in the molten salt 2, while a cathode 8 is disposed in a partitioned small chamber 11 in isolation from the molten salt 2 by means of a partitioning wall 6. Cathode 8 is disposed in a molten salt 7 identical to the molten salt 2. Partitioning wall 6 is made of a material which is not corroded by the molten salt even at elevated temperatures, and it has penetrant pores, which can hold the molten salt in its body when immersed therein. In addition, the size of these pores are sufficiently minute that a great resistance is demonstrated to the diffusive migratory flow of the harmful substances. For instance, partitioning wall 6 must be made of a material such as porous aluminous porcelain. Now, when in this apparatus, which has been arranged as described above, a voltage is applied from a direct current source 9 and a current is caused to flow from the anode 5 to the cathode 8, we found that the concentration of the harmful substances present in the molten salt 2 gradually decreased while, on the other hand, the concentration of the harmful substances in the molten salt 7 gradually increased, with the consequence that the harmful substances were accumulated and concentrated in the molten salt 7. Now, when the concentration of the harmful substances in the molten salt 7 becomes much higher than that in the molten salt 2 in this manner, there arises a tendency of the harmful substances to migrate in the direction of the molten salt 2 from the molten salt 7 by diffusion. However, since this migration by diffusion is blocked by the pores of the partitioning wall 6, the accumulation of the harmful substances in the molten salt 7 progresses increasingly. Molten salt 7 is continuously or intermittently discharged externally of the regeneration treatment apparatus by a suitable method during the operation of the regeneration treatment. As a suitable method of carrying out the discharge of the molten salt 7, that of providing an overflow outlet to the small chamber 11 at a level lower than the liquid level of the molten metal bath 2 (as shown by 10 in FIG. 1) and causing the discharge of the molten salt 7 overflowingly is to be preferred, for the reason that the difference in the liquid levels between the molten salts 2 and 7 will promote the one-way flow of the harmful substances from the molten salt 2 to the molten salt 7.

It is an important requirement in the invention method that the partitioning wall 6 be made of a material that is not corroded by the molten salt at the elevated temperature at which the treatment is carried out. If the partitioning wall 6 is made of a material such as glass which is corroded by the molten salt at elevated temperatures, the glass partitioning wall would gradually become corroded by the molten salt to finally result in large holes penetrating the partitioning wall being formed. As a consequence, it would become impossible to block the migration to the molten salt 2 side by diffusion of the harmful substances that are present in the molten salt 7 held in the small chamber 11. Thus, the degradation of the molten salt 2 would again take place, and it would not be possible at all to achieve the regeneration effects by means of the invention method.

Therefore, the material to be used for the partitioning wall in the present invention must satisfy the two conditions: that it is not corroded by the molten salt at the elevated temperatures at which the treatment is carried out, and that it possesses in its body a multiplicity of penetrant pores such as specified by the present invention. Materials which satisfy these conditions include such, for example, as the alkali resistant porous ceramics and refractories, of which the high aluminous porous porcelain is especially to be preferred.

As to the pore radium and porosity of the partitioning wall, various combinations can be employed in consideration of the properties of the partitioning wall such as the area of the partitioning wall, its electric resistance during flow of electricity and the amount of the molten salt, as well as the economic considerations of the ion exchange treatment. However, usually a combination which will enable the passage of molten salt of the order of 0.5 percent of the total molten salt per hour will do.

FIGS. 3 and 4 illustrate other modes of the apparatus that can be used for practicing the invention method. As in the case of the apparatus shown in FIG. 1, the cathode is disposed inside a small chamber 11, which is partitioned by means of a partitioning wall 6 provided in a vessel 1. The numeral 10 is the overflow outlet for overflowing the molten salt held in the small chamber 11. In these apparatus it is a desirable procedure for preventing the leakage of the harmful substances present in the small chamber 11 from the parts of contact of the partitioning wall 6 and the vessel 1, to cool these parts from the outside by means of forced means and thus cool and solidify only the molten salt that is present in the neighborhood of these parts.

The description so far has been principally that concerning a method of treatment of a once degraded molten salt by means of the invention method to thereby eliminate the harmful substances and thus restore the activity of the molten salt for use in the ion exchange treatment.

As a modification of the invention method, there can be mentioned a method of conjointly carrying out the ion exchange treatment of a glass article in the molten salt 2 at the same time the harmful substances are being eliminated from the molten salt 2, as hereinbefore described. If the operation of eliminating the harmful substances is not carried out concurrently but only the ion exchange treatment of the glass article is carried out, there would be a gradual formation and accumulation in the molten salt 2 of the harmful substances, as hereinbefore noted. However, if in this case the method of eliminating of the harmful substances is conjointly carried out, as in the modification of the present invention, the harmful substances formed in the molten salt 2 by means of the ion exchange treatment would be eliminated from the molten salt 2 by the invention elimination treatment, with the consequence that the accumulation of the harmful substances in the molten salt 2 can be completely avoided, and hence it would become possible to carry out the ion exchange treatment of glass articles over an exceedingly long period of time and at elevated temperatures without the accompaniment of the degradation phenomenon of the molten salt at all. The practice of this modification is illustrated in FIG. 1. Thus, in FIG. 1 glass articles 4 are immersed in the molten salt 2 by being set in a rack 3 disposed in the bath of molten salt. The ion exchange treatment of the glass article and the treatment of eliminating the harmful substances from the molten salt 2 are thus carried out concurrently in an apparatus which has been arranged in this manner.

In the method of this invention the voltage to be applied across the anode and cathode varies depending upon the resistances between the electrodes that are ascribable to the properties of the partitioning wall and other factors. Hence, the voltage to be used cannot be readily decided unqualifiedly. In the mode in which the ion exchange treatment of the glass articles and the removal of the harmful substances from the molten salt are to be carried out concurrently, the electric current that is required to be flowed continuously through the molten salt bath for preventing the adverse effects to the glass article as a result of the degradation of the molten salt is a very small value. As indicated in the hereinafter given Example 1, a current of the order of several milliamperes to several tens of milliamperes will be sufficient. However, even though a current of the order of several hundred milliamperes to several amperes is used, no special difficulties are experienced, but good results are had instead. Hence, the choice of the current to be used should be made in consideration of economy. Further, as methods of effecting the flow of the electricity, not only the method of causing a small current to flow continuously but also that of causing a large current to flow for short periods of time at time intervals such that no substantial degradation of the molten salt is noted and such that the quantity of electricity applied equals in value to that in the case of the method described above may also be employed. However, for obtaining treatment effects that are stable, most preferred is that in which the degradation of the molten salt is prevented by causing the flow of a constant current continuously. In reference to the statement hereinbefore that even though a large current is used, no difficulties are experienced but good results are had instead, this is particularly conveniently applicable to the case where it is necessary to rapidly regenerate the once degraded molten salt either in situ or after withdrawal of the degraded molten salt externally of the ion exchange treatment system.

The electric current used need not necessarily be a perfectly rectified stationary electric current but may be a pulsating current containing in part an alternating current component.

The temperature of the molten salt should be maintained at 350° – 600°C. in the method of the present invention.

As indicated hereinbefore, the present invention provides a very simple method of solving the problem of preventing the degradation of the molten salt and its regeneration, a matter which was the principal cause in preventing the practical application of the chemical method of strengthening glass articles on a commercial scale. By the employment of the invention method, the life of the expensive molten salt can be prolonged and the frequency of renewal of the molten salt can be reduced, with the consequence that a decrease in the material costs can be achieved. Further, since the invention method can effectively achieve the elimination of the harmful substances even when the treatment is carried out at elevated temperatures, the inconsistency that when the temperature of the molten salt bath is raised to carry out the strengthening treatment in a short time, the rate of degradation of the molten salt also becomes great is also solved. Hence, it becomes possible to greatly shorten the treatment time, and this results in a conspicuous reduction in the fixed costs. Hence, this invention can be said to be very valuable from the industrial standpoint.

The following examples are given for more fully illustrating the invention.

EXAMPLE 1

Using the apparatus shown in FIG. 1, the treatment for eliminating the harmful substances from the molten salt was carried out concurrently with the ion exchange treatment of a sheet glass. The sheet glass used was of the dimensions 50 mm long, 50 mm wide and 2 mm thick and of the following composition and strain point. Composition by weight: $SiO_2$ 72.5 %, $Al_2O_3$ 1.7 %, CaO 7.6 %, MgO 3.9 %, $Na_2O$ 13.0 %, and remainder 1.3 %. Strain point: 515°C.

The stainless steel vessel 1 shown in FIG. 1 is charged with 1 kg of molten potassium nitrate and is held at the desired temperature by means of a heater and thermostat (not shown). Anode 5 and cathode 8 of stainless steel are disposed in the molten salt. Cathode 8 is enclosed in a porous aluminous porcelain tube 6 equipped with a overflow pipe 10, after which the tube 6 is filled with the same molten potassium nitrate as that contained in the vessel 1. While causing an electric current to flow continuously through the electrodes 5 and 8 from a direct current source, the glass 4 set in a rack 3 is immersed in the molten potassium nitrate 2. The glass is treated by immersion in this manner for a period of 1 hour. In carrying out this treatment, various combinations of the temperature of the molten salt ranging between 500° and 600°C. with electric current values corresponding to the several temperatures are used. After the treatment, the glass is washed and dried, and its surface condition is examined. The minimum values of the electric current at which the immersion treatment can be carried out under the conditions indicated hereinabove without corroding the surface of the glass are as shown in FIG. 2.

EXAMPLE 2

Twenty sheets of glass of identical dimensions and identical composition as that used in Example 1 were used. Of these sheet glasses, 10 sheets (which were designated group A) were immersed for 16 hours at 490°C. in 1.5 kg of molten potassium nitrate which had been degraded by holding for 30 days at 490°C. After the immersion treatment, the glasses were withdrawn, water-washed and dried. Next, as in the apparatus shown in FIG. 1 electrodes and a partitioning wall were disposed, following which the regeneration treatment of the molten salt was carried out by holding the temperature of the molten salt at 490°C. and causing a 500 mA current to flow for 1 hour by applying 3 volts across the two electrodes. Thereafter, the remaining 10 sheets of glass (which were designated group B) were immersed for 16 hours at the same temperature as in the case with the group A glasses in molten potassium nitrate that had undergone the regeneration treatment. After the treatment, the glasses were withdrawn from the bath and water-washed and dried. Then the treatment-completed two groups of glasses A and B were tested for their strength by the symmetrical bending strength testing method, which is carried out in the following manner. A specimen is placed on supporting ring of a predetermined diameter. A load ring having a smaller outside diameter than the inside diameter of the supporting ring is then placed atop the specimen, after which a load is applied to the load ring. The breakage strength of the specimen is calculated from the load required for breakage of the glass specimen. The detailed procedure of this test is described in *Stekro i Keramika*, 9, 9 (1962). The results obtained by using a lower supporting ring of 6.3 mm diameter and an upper load ring of 7.4 mm diameter are shown in Table 1. The values of the strength in each case are the average values of the symmetrical bending strength test of the two groups of sheet glasses. A greater strength is demonstrated in the case of the group in which the treatment was carried out after causing the electricity to flow through the molten salt bath.

Table 1

| Group | Treatment conditions | Strength (kg/cm²) | Standard deviation | No. of specimen |
|---|---|---|---|---|
| A | Treatment before flowing electricity | 4,800 | 780 | 10 |
| B | Treatment after flowing electricity | 6,300 | 620 | 10 |

EXAMPLE 3

As a method of achieving an improvement in the effects of the chemical strengthening method, there is a method of conducting the ion exchange in multistages, and in one stage of this method the ion exchange is carried out at a temperature higher than the strain point for obtaining a deeper ion exchanged layer. In this example an experiment was conducted for examining the effects achieved in preventing the corrosion of the surface of the glass in this stage. A round rod 30 mm in length and 5 mm in diameter of borosilicate glass (composition by weight: $SiO_2$ 69.2 %, $B_2O_3$ 11.4 %, $Na_2O$ 12.4 %, $K_2O$ 6.2 % and $Al_2O_3$ 0.6 %; strain point: 490°C.) was treated by immersion for 1 hour at 600°C. in about 1.5 kg of a mixed molten salt bath consisting of potassium nitrate and sodium nitrate in a molar ratio of 7:3, which had been degraded in advance by having been held for 16 hours at 600°C. After completion of the treatment, the rod was withdrawn, water-washed and dried. On examination of this glass rod, the surface thereof was corroded and without any luster. It is thus apparent that degradation of the molten salt had taken place as a result of its having been held for 16 hours at 600°C. Next, in this same salt bath, electrodes and a partitioning wall were disposed as in the apparatus shown in FIG. 1, and the regeneration of the foregoing molten salt was carried out by holding the temperature of the molten salt at 600°C. and by causing an electric current of 700 mA to flow for 1 hour by applying 3 volts across the electrodes. A round rod of borosilicate glass of the same composition and same dimensions as that used hereinabove was then immersed for 1 hour likewise at 600°C. in the so regenerated molten salt, followed by water-washing and drying. When the surface of this glass rod treated with the regenerated molten salt was examined, it was found that the surface of the treated glass was not affected at all and that the luster possessed inherently by glass was maintained. From this, it became clear that the invention method was able to eliminate effectively from the molten salt the harmful substances which had caused the degradation thereof.

EXAMPLE 4

It has been made clear from Example 3 that the molten salt is degraded when it is exposed to the heating conditions indicated therein. This example will illustrate that it is possible to expose the molten salt to such heating conditions without causing any degradation at all of the molten salt if the exposure to such heating conditions is carried out while applying the method of the present invention. Electrodes and the partitioning wall were disposed as in the apparatus shown in FIG. 1 in a mixed molten salt bath of the same composition as that of Example 3, after which this bath was maintained for 16 hours at 600°C. while causing an electric current of 700 mA to flow by applying 3 volts across the electrodes. While causing the same current to flow at the same temperature, a round rod of borosilicate glass of the same composition as that of Example 3 was then treated by immersion in the molten salt bath for one hour. The surface of the treated glass was not corroded at all, the luster inherently possessed by glass being maintained.

We claim:

1. In a method for chemically strengthening glass articles by use of a molten salt, said chemical strengthening consisting of:
   a. contacting the glass articles at an elevated temperature but below its deformation temperature with a molten salt containing an alkali metal R' having a larger ion radius than that of the alkali metal R contained in the glass articles to form thereon a surface layer resulting from the exchange of ions of the aforesaid alkali metals R and R';
   b. eliminating from said molten salt the thermally decomposed products which are detrimental to the strengthening of the glass articles;

the improvement comprising disposing an anode and a cathode in a bath of molten salt maintained at an elevated temperature, with the proviso that said cathode is disposed in a small chamber partitioned in isolation from the rest of the molten salt bath by means of a partitioning wall, said wall being made of a material that is not corroded by the molten salt at said elevated temperature, said wall having penetrable pores, holding molten salt in its body, and capable of passing the molten salt, the size of said pores being so minute that a great resistance is demonstrated to the diffusive flow of said detrimental substances, said material being also conductive as a result of the ion conductivity through the molten salt held in said pores; and applying a voltage across said anode and cathode to cause the flow of an electric current therebetween whereby said detrimental substances are accumulated in said small chamber, and then eliminating the detrimental substances concentrated around the cathode.

2. The method according to claim 1 wherein a part of the molten salt contained in said small chamber is discharged externally of the system during the time the elimination of the harmful substance is being carried out.

3. The method according to claim 2 which comprises carrying out the discharge of a part of said molten salt while maintaining the liquid level of the molten salt in which the cathode is disposed at a lower level than that at which the molten salt in which the anode is disposed.

4. The method according to claim 1 which comprises immersing a glass article in the molten salt in which the anode is disposed and concurrently carrying out the elimination of the harmful substances as the the chemical strengthening of the glass article is being carried out.

* * * * *